Figure 1:
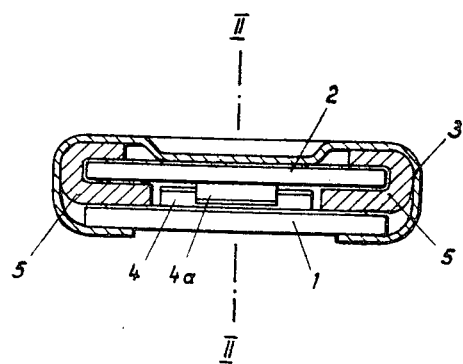

Aug. 7, 1956　　　A. R. GEISSELSODER　　　2,758,262
DRY CONTACT RECTIFIER
Filed June 26, 1953

INVENTOR
A. R. GEISSELSODER
BY *Philip M. Bolton*
ATTORNEY

United States Patent Office 2,758,262
Patented Aug. 7, 1956

2,758,262

DRY CONTACT RECTIFIER

Albrecht R. Geisselsoder, Nurnberg, Germany, assignor to International Standard Electric Corporation, New York, N. Y., a corporation of Delaware Application June 26, 1953, Serial No. 364,420

Claims priority, application Germany July 2, 1952

8 Claims. (Cl. 317—234)

The invention relates to a dry-cell rectifier arrangement of small dimensions, to be manufactured with particular amount of equipment. Such a dry-cell rectifier is to be used preferably in cases where some kind of enclosure is already available for a certain purpose. This applies for instance to dry-cell rectifiers which are to be built into the microphone or receiver capsule of a telephone.

It is already known to insert several rectifier elements into a metal envelope, more particularly, a hermetically sealed capsule has been employed in most cases.

It has now been recognized that a simpler solution may be chosen for assembly of the rectifier elements into one unit, whenever accommodation of these elements into such kind of casing is intended, as is provided for other reasons, for instance into the microphone capsule or the receiver of a telephone handset, respectively.

It is a novel feature of this invention that the rectifier elements are arranged in a protective envelope which serves as an electrical connection and whose walls are at least partially formed by a rectifier element. This provides the additional advantage of good cooling. It is, moreover, possible to attain protection against external influences, sufficient for the purpose here involved, by coating the unit with an insulating layer of varnish.

Figure 2:
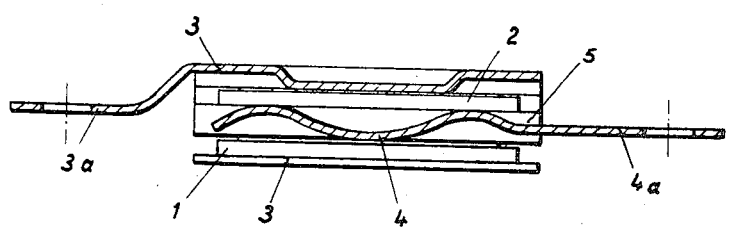

An example of the invention is shown in the drawing in which:

Figure 1 is a transverse sectional view and Fig. 2 is a longitudinal section along the line II—II The unit, according to the invention, consists of two rectifier elements 1 and 2, enclosed in and supported by a sheet metal envelope 3. This sheet metal clamp encloses the rectifier elements only partially, so that the rectifier element 1 constitutes a mechanical bridge between the open ends. The metal sheet clamp serves at the same time as one terminal and an electrical connection between the two rectifier elements 1 and 2. The other electrical terminal is through a spring 4 which is brought out through one opening in the front side of the metal sheet clamp 3. Spring 4 ends in a contact lug 4a, which in practice serves at the same time as a support. At the opposite side, a contact and supporting lug is constituted by a flange 3a of the metal sheet clamp 3. The two rectifier elements are held apart a determined distance for cooling purposes, by means of an insulating layer 5.

The casing may also be provided with one of several openings, on the side adjacent the rectifier element 2, in order thus to obtain additional cooling. The complete unit according to the invention may be finally coated, with the exception of the contact lugs, with insulating lacquer for protection against external influences.

The invention is not limited to the sample embodiment but also covers all similar structural design modes.

What is claimed is:

1. A dry-contact rectifier assembly comprising a pair of rectifier elements mounted in axially aligned position, means for interconnecting the adjacent surfaces of said rectifier elements, and a clamp of conductive material having two ends in contact with the other surface of one of said elements extending around opposite edges of said one of said elements and into contact with the other surface of the other element, whereby said clamp serves to partially close said rectifier elements and to hold them together, and as an electrical connection for the assembly.

2. A rectifier assembly according to claim 1, wherein said means-for-interconnecting comprises a spring member bearing upon said adjacent surfaces, and provided with a terminal and mounting tab.

3. A rectifier assembly according to claim 2, further comprising an extension on said clamp member provided with a connecting lug to serve as a second terminal and support member for said assembly.

4. A dry rectifier device, comprising a stack of plate-shaped rectifier elements, electrodes stacked together with said elements and having respective terminal lugs extending away from the stack, one of said electrodes constituting one end of said stack and forming a clamp structure embracing opposite edges of the stack and contacting the other end of said stack for securing the rectifier elements and the electrodes together.

5. A dry rectifier device, comprising a stack of plate-shaped rectifier elements, electrodes stacked together with said elements and having respective terminal lugs extending away from the stack, one of said electrodes constituting one end of said stack and having integral bendable clamping parts adapted to embrace opposite edges of the stack and contact the other end of the stack for holding the stack together.

6. A dry rectifier device, comprising a stack of plate-shaped rectifier elements, electrodes stacked together with said elements and having respective terminal lugs extending away from the stack, at least one of said electrodes forming a frame structure partially enclosing the stack, and resilient means positioned to exert pressure between said one electrode and the rest of the stack, whereby the stack is clamped together by said one electrode and said resilient means.

7. A dry rectifier device, comprising a stack of plate-shaped rectifier elements, electrodes stacked together with said elements and having respective terminal lugs extending away from the stack, one of said electrodes constituting one end of said stack and forming a clamp structure surrounding opposite edges of the stack and contacting the other end of said stack for holding it together, insulating material forming part of the stack, said one electrode being in engagement with said insulation for securing it in proper position to prevent short-circuiting between said rectifier elements by said one electrode.

8. A dry rectifier device, comprising a stack of plate-shaped rectifier elements, electrodes stacked together with said elements and having respective terminal lugs extending away from the stack, one of said electrodes constituting one end of said stack and forming a clamp structure enveloping opposed edges of the stack and contacting the other end of said stack for holding it together, insulating material forming part of the stack, and having an opening, and said one electrode having a portion entering through said opening into contact with the adjacent one of said rectifier elements.

References Cited in the file of this patent

UNITED STATES PATENTS

| | | |
|---|---|---|
| 2,261,618 | Esseling et al. | Nov. 4, 1941 |
| 2,369,185 | Skinker | Feb. 13, 1945 |
| 2,545,863 | Sell et al. | Mar. 20, 1951 |
| 2,665,399 | Lingel | Jan. 5, 1954 |